(12) United States Patent
Stang

(10) Patent No.: US 11,841,158 B2
(45) Date of Patent: Dec. 12, 2023

(54) AIR CONDITIONER ENERGY RECOVERY UNIT

(71) Applicant: Darrel Stang, Edmonton (CA)

(72) Inventor: Darrel Stang, Edmonton (CA)

( * ) Notice: Subject to any disclaimer, the term of this patent is extended or adjusted under 35 U.S.C. 154(b) by 156 days.

(21) Appl. No.: 17/065,611

(22) Filed: Oct. 8, 2020

(65) Prior Publication Data

US 2021/0285678 A1 Sep. 16, 2021

(30) Foreign Application Priority Data

Mar. 13, 2020 (CA) .................................. CA 3075565

(51) Int. Cl.
*F24F 11/74* (2018.01)

(52) U.S. Cl.
CPC .................................... *F24F 11/74* (2018.01)

(58) Field of Classification Search
CPC ...... F24F 12/00; F24F 2007/001; F24F 11/74; F03D 9/25; F03D 9/00; F03D 9/11; Y02E 70/30; F04D 25/08; F04D 25/166; F05B 2220/602; F15D 1/0005
See application file for complete search history.

(56) References Cited

U.S. PATENT DOCUMENTS

| | | | |
|---|---|---|---|
| 6,365,985 B1 | 4/2002 | Cohen | |
| 7,208,846 B2 | 4/2007 | Liang | |
| 8,183,709 B1 * | 5/2012 | Manning | F03D 9/11 290/55 |
| 8,564,148 B1 | 10/2013 | Novak | |
| 8,791,587 B2 | 7/2014 | Smith, Jr. et al. | |
| 9,103,320 B1 | 8/2015 | Potts et al. | |
| 9,260,975 B2 | 2/2016 | Schuler | |
| 9,812,926 B1 | 11/2017 | Rodriquez | |
| 10,060,667 B2 | 8/2018 | Martens | |

(Continued)

FOREIGN PATENT DOCUMENTS

| | | | | |
|---|---|---|---|---|
| CN | 202493453 U | * | 10/2012 | |
| FR | 2955627 A1 | * | 7/2011 | ............. F03D 11/04 |
| FR | 2991437 A1 | * | 12/2013 | ............. F03D 9/00 |

(Continued)

OTHER PUBLICATIONS

University of Kentucky College of Agriculture, Food and Environment, Apr. 29, 2008, "Kidwind Mini Wind Farm" (Year: 2008).*

(Continued)

*Primary Examiner* — Edelmira Bosques
*Assistant Examiner* — Brett Peterson Mallon
(74) *Attorney, Agent, or Firm* — Finch & Maloney PLLC

(57) ABSTRACT

An air conditioner energy recovery unit has a hood, at least one aperture into which a fan is positioned, a generator and a power storage. The hood has a substantially pyramidal shape. The substantially pyramidal shape has at least three sides that meet at an apex. The hood has a hollow interior and an open base. At least one of the at least three sides has an aperture into which a fan is positioned. A generator is provided in communication with the fan such that when the fan rotates, the generator creates electricity. A power storage is provided in communication with the generator for storing electricity created by rotation of the fan.

15 Claims, 5 Drawing Sheets

(56) References Cited

U.S. PATENT DOCUMENTS

2009/0146425 A1   6/2009  Widisky

FOREIGN PATENT DOCUMENTS

| | | | |
|---|---|---|---|
| JP | 2017052185 A | * | 3/2017 |
| WO | 2015025071 A1 | | 2/2015 |

OTHER PUBLICATIONS

English Translation of CN-202493453-U, dated May 3, 2022 (Year: 2022).*
English Translation of FR-2991437-A1, dated May 3, 2022 (Year: 2022).*
English Translation of JP-2017052185-A, dated May 5, 2022 (Year: 2022).*
English Translation of FR-2955627-A1, dated May 5, 2022 (Year: 2022).*

* cited by examiner

AIR CONDITIONER ENERGY RECOVERY UNIT

FIELD OF THE DISCLOSURE

The present application relates generally to an air conditioner energy recovery unit.

BACKGROUND

This section provides background information to facilitate a better understanding of the various aspects of the invention. It should be understood that the statements in this section of this document are to be read in this light, and not as admissions of prior art.

During use of an air conditioner, it is common for an air conditioning unit to expel moving air. Generally, this moving air dissipates into the ambient air surrounding the air conditioner and any potential energy associated with the moving air is lost. The dissipation of the moving air is a lost opportunity to recover energy and improve energy conservation efforts.

BRIEF SUMMARY

There is provided an air conditioner energy recovery unit that has a hood, at least one fan, a generator and a power storage. The hood has a substantially pyramidal shape. The substantially pyramidal shape has at least three sides that meet at an apex. The hood has a hollow interior and an open base. At least one of the at least three sides has an aperture into which a fan is positioned. The generator is provided in communication with the fan such that when the fan rotates the generator creates electricity. The power storage is provided in communication with the generator for storing electricity created by rotation of the fan.

In one embodiment, each of the at least three sides has an aperture into which a fan is positioned.

In one embodiment, the aperture and the fan are positioned centrally on at least one of the at least three sides.

In one embodiment, the power storage has at least one battery.

In one embodiment, a voltage regulator is positioned between the generator and the power storage to regulate the voltage passing into the power storage.

In one embodiment, the substantially pyramidal shape has four sides.

In one embodiment, the fans positioned on each of the at least three sides are connected together in series.

In one embodiment, an inverted pyramid having at least three sides, a base and an apex is provided. The number of sides of the inverted pyramid is equal to the number of sides of the substantially pyramidal shape of the hood. The inverted pyramid is positioned within the hollow interior of the hood such that the base of the inverted pyramid is adjacent the apex of the substantially pyramidal shape and the apex of the inverted pyramid is positioned below the base of the inverted pyramid.

In one embodiment, the substantially pyramidal shape has four sides.

In one embodiment, the inverted pyramid is a truncated pyramid.

In one embodiment, the height of the inverted pyramid and the length of the base of the inverted pyramid are equal.

In one embodiment, a pocket is positioned on an exterior surface of the hood. The pocket may house a multi-function meter for measuring the current created by the rotation of the fans.

BRIEF DESCRIPTION OF THE DRAWINGS

These and other features will become more apparent from the following description in which references are made to the following drawings, in which numerical references denote like parts. The drawings are for the purpose of illustration only and are not intended to in any way limit the scope of the invention to the particular embodiments shown.

DETAILED DESCRIPTION OF THE PREFERRED EMBODIMENTS

Figure 1:
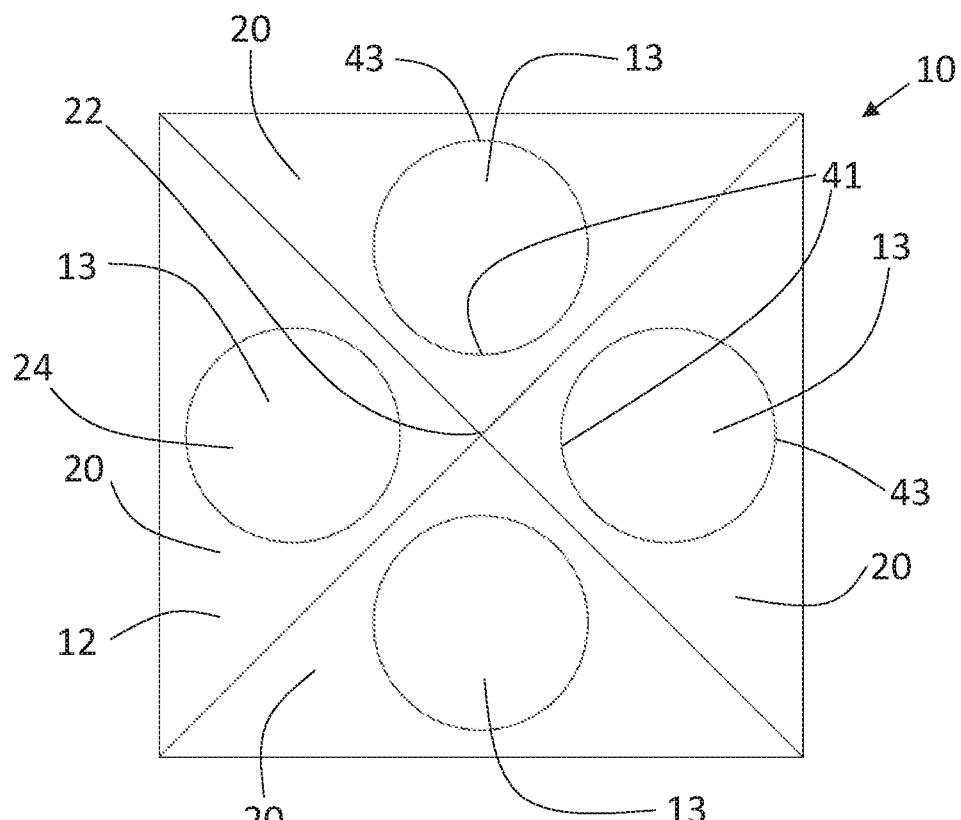
FIG. 1 is a top plan view of an air conditioner energy recovery unit.
Figure 2:
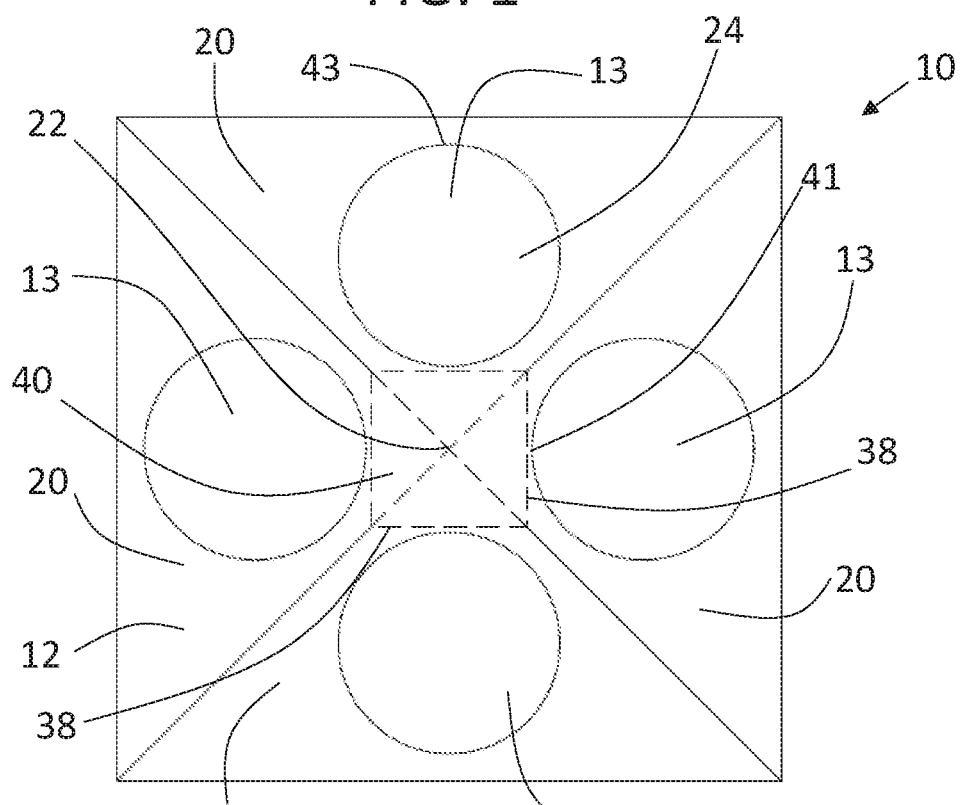
FIG. 2 is a top plan view, partially in section, of the air conditioner energy recovery unit.

An air conditioner energy recovery unit, generally identified by reference numeral 10, will now be described with reference to FIG. 1 through FIG. 9.

Figure 3:
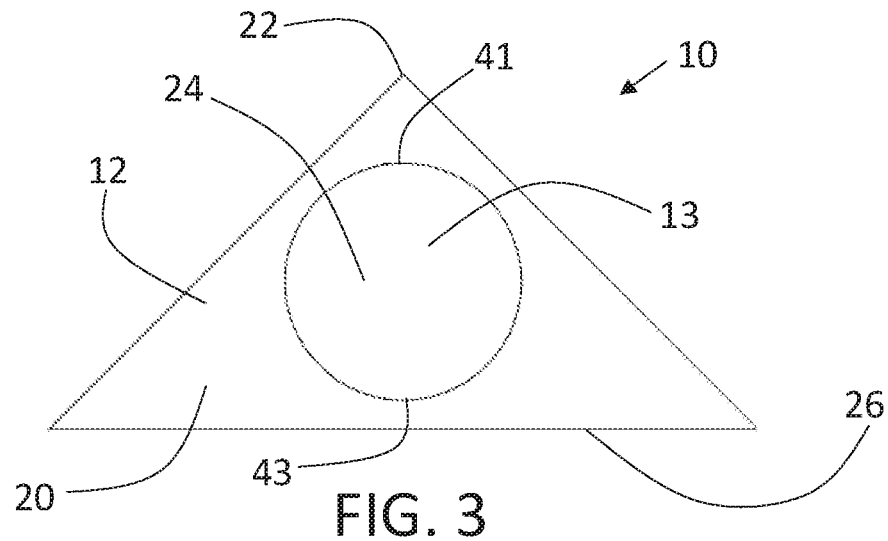
FIG. 3 is a side elevation view of the air conditioner energy recovery unit.
Figure 5:
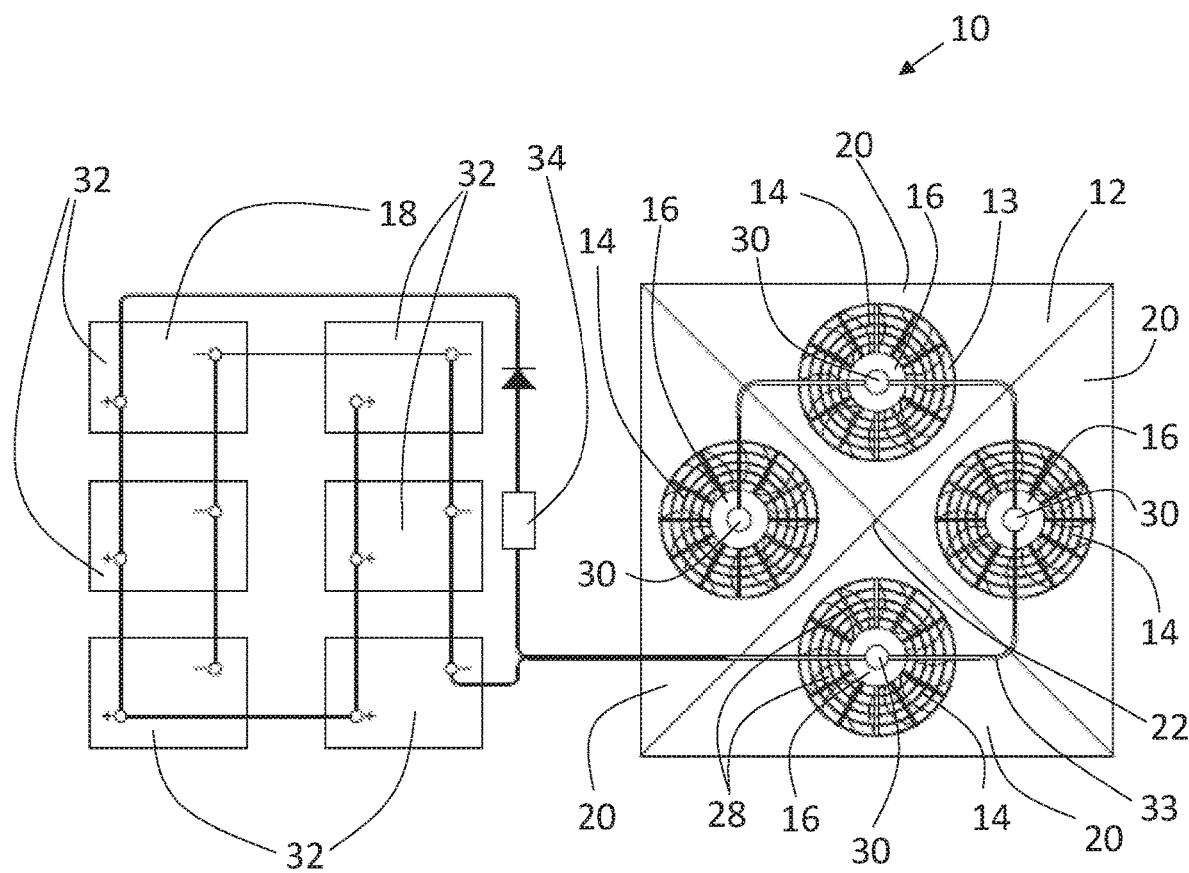
FIG. 5 is a top plan schematic view of the air conditioner energy recovery unit.
Figure 6:
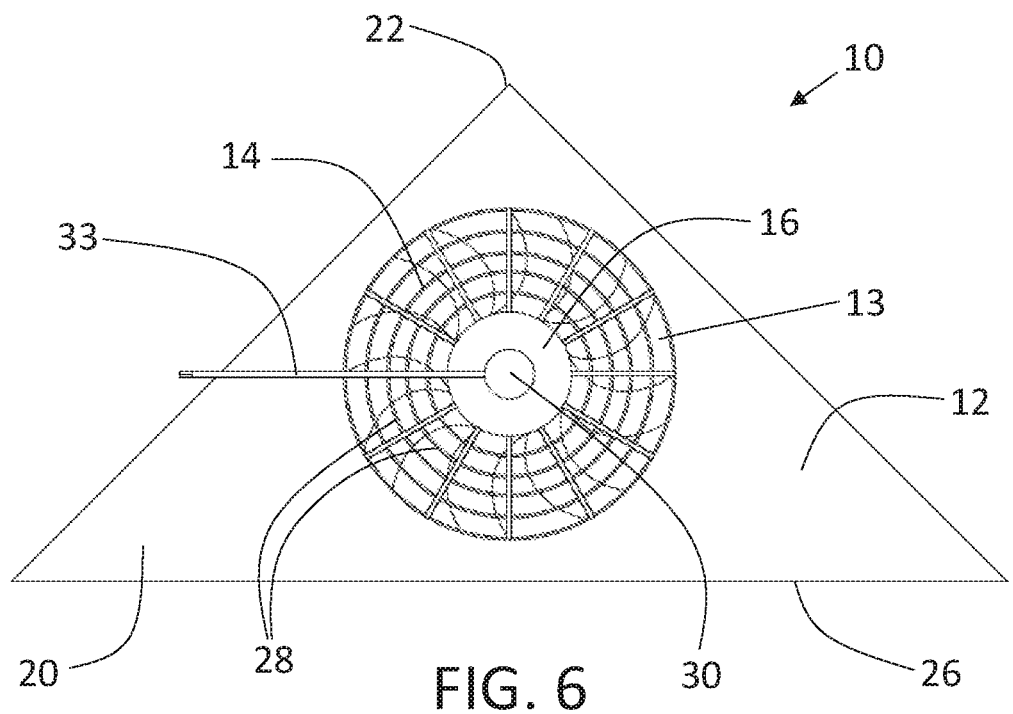
FIG. 6 is a side elevation view of the air conditioner energy recovery unit.
Figure 9:
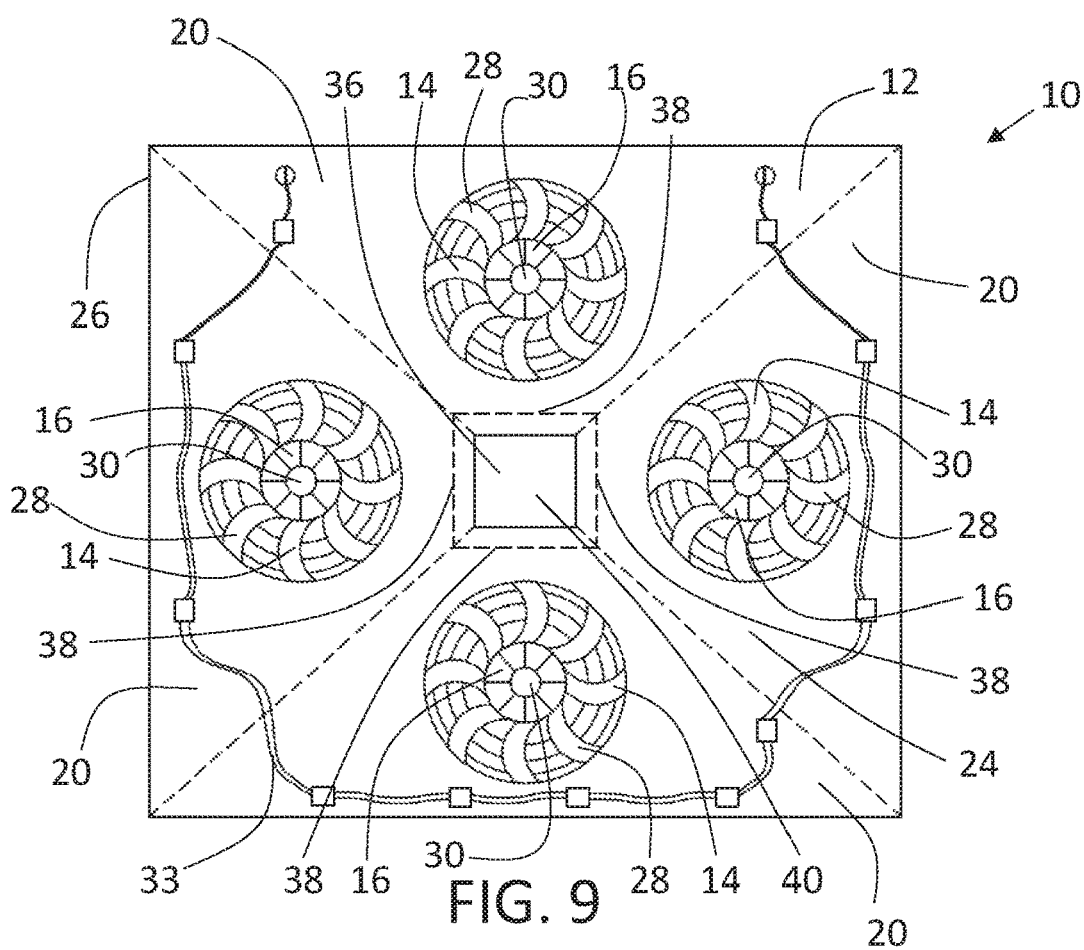
FIG. 9 is a bottom plan view of the air conditioner energy recovery unit.

Referring to FIG. 5, an air conditioner energy recovery unit 10 has a hood 12, at least one aperture 13 into which a fan 14 is positioned, a generator 16 and a power storage 18. Air conditioner energy recovery unit 10 is designed to sit atop an air conditioner unit such that wind discharge from an air conditioner unit is sent into hood 12. Referring to FIG. 3, hood 12 has a substantially pyramidal shape with at least three sides 20 meeting at an apex 22. In the embodiments shown in FIG. 1 and FIG. 2, hood 12 has four sides 20 meeting at apex 22. It will be understood by a person skilled in the art that hood 12 may have more or fewer sides than what is shown. Referring to FIG. 9, hood 12 has a hollow interior 24 and an open base 26. Referring to FIG. 6, at least one of sides 20 has an aperture 13 into which a fan 14 is positioned. Fan 14 has a plurality of blades 28 connected to a central rotor 30. It will be understood by a person skilled in the art that the number of blades 28 may affect the ability to rotate rotor 30, however any number of blades 28 may be used. Air passing through aperture 13 and fan 14 causes blades 28 to rotate which in turn cause rotor 30 to rotate. In the embodiment shown in FIG. 5, all four sides 20 of hood 12 have an aperture 13 and a fan 14. In the embodiments shown, aperture 13 and fan 14 are positioned centrally on sides 20. It will be understood by a person skilled in the art that apertures 13 and fans 14 can be positioned anywhere on sides 20, however greater efficiency may be seen when apertures 13 and fans 14 are positioned centrally. A generator 16 is provided in communication with fan 14 such that when blades 28 and rotor 30 rotate, generator 16 creates electricity. Generator 16 is connected to rotor 30. Power storage 18 is provided in communication with generator 16 for storing electricity created by rotation of fan 14. In the embodiment shown, power storage 18 consists of six batteries 32. It will be understood by a person skilled in the art that power storage 18 may have more or fewer batteries 32 or have a different way of providing electricity storage. To regulate voltage levels traveling into power storage 18, a voltage regulator 34 may be positioned between generator 16 and power storage 18.

In the embodiment shown, fans 14 positioned on each side 20 of hood 12 are connected together in series by an electrical conducting wire 33 such that electricity generated by a first fan 14 in the series travels to a second fan 14 in the series and continues until it reaches the voltage regulator 34 or power storage 18.

Figure 4:
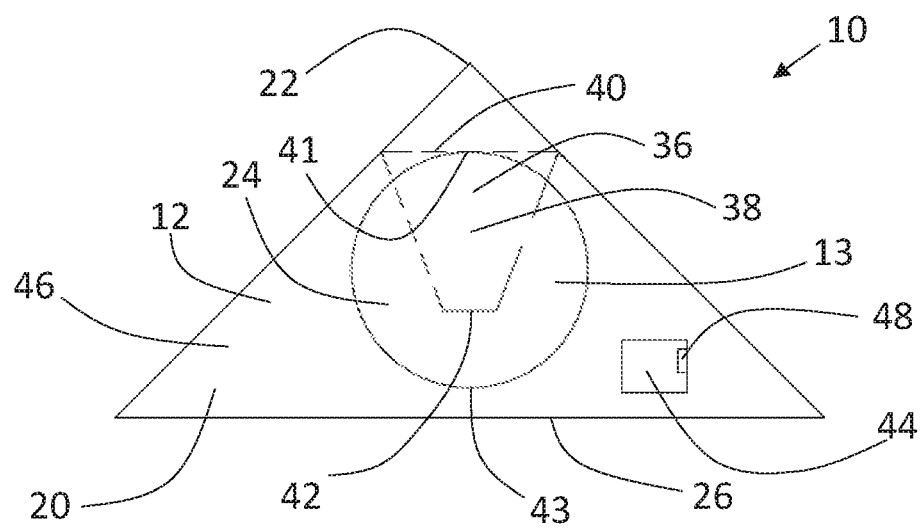
FIG. 4 is a side elevation view, partially in section, of the air conditioner energy recovery unit.
Figure 7:
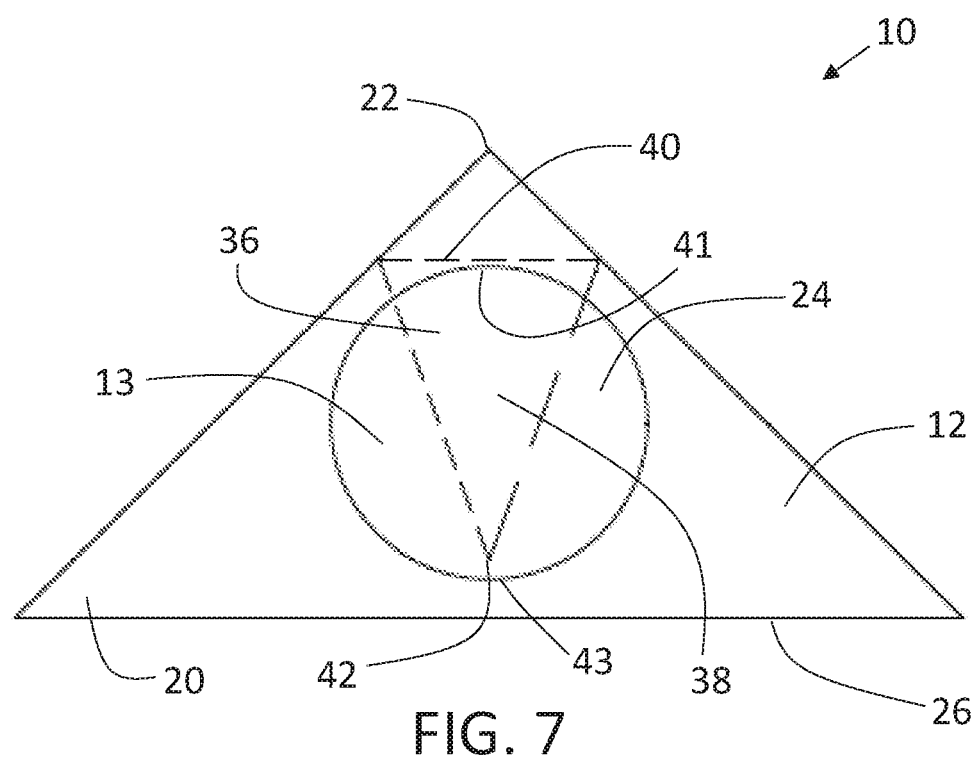
FIG. 7 is a side elevation view, partially in section, of the air conditioner energy recovery unit.
Figure 8:
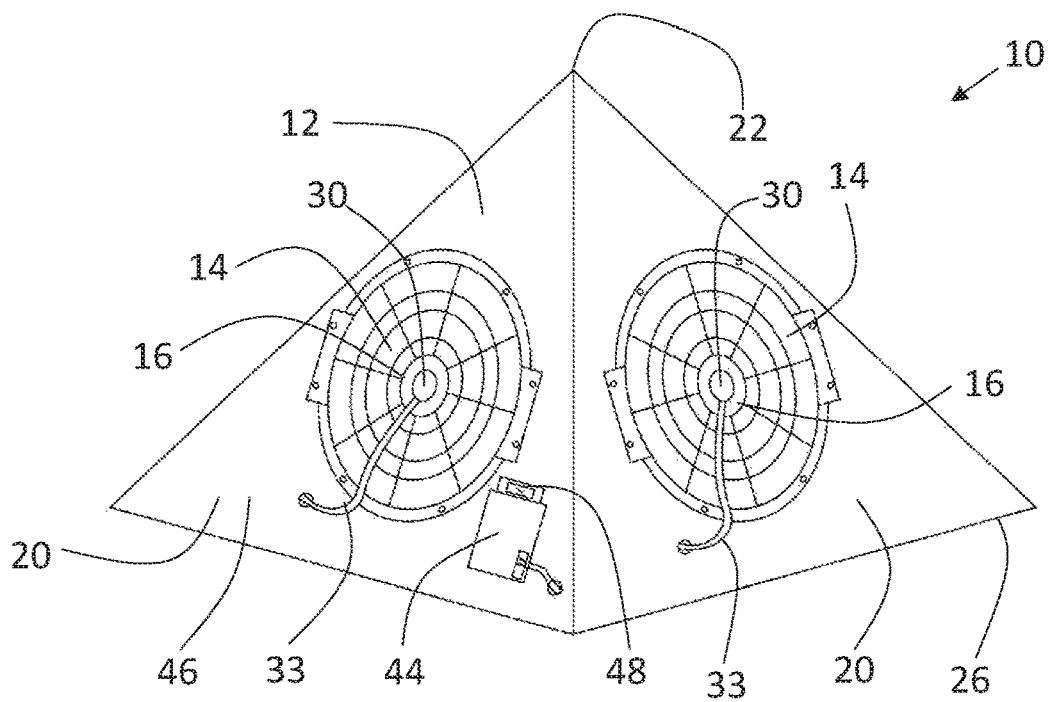
FIG. 8 is a perspective view of the air conditioner energy recovery unit.

In the embodiments shown in FIG. 9, an inverted pyramid 36 is provided that has four sides 38, a base 40, and an apex 42. It will be understood by a person skilled in the art that inverted pyramid 36 should have at least three sides and that the number of sides 38 of inverted pyramid 36 is equal to the number of sides 20 of substantially pyramid shape of hood 12. In the embodiments shown in FIG. 4 and FIG. 7, inverted pyramid 36 is positioned within hollow interior 24 of hood 12 such that base 40 of inverted pyramid 36 is adjacent the apex 22 of substantially pyramidal shape of hood 12 and apex 42 of inverted pyramid 36 is positioned below base 40 of inverted pyramid 36. Inverted pyramid 36 acts to direct airflow entering hood through open base 26 towards apertures 13 and fans 14. Inverted pyramid also helps to prevent a "dead spot" of trapped air at the peak of hood 12. As can be seen in FIG. 4 and FIG. 7, base 40 of inverted pyramid 36 effectively seals off access to apex 22 of hood 12 from the rest of hollow interior 24. While this makes the system more efficient, it will be understood by a person skilled in the art that inverted pyramid 36 may not completely seal off access to apex 22. An unsealed apex 22 may reduce the effectiveness of airflow from open base 26 through apertures 13 and fans 14 as air may become stagnant at apex 22. In the embodiments shown, base 40 of inverted pyramid 36 aligns with a top 41 of aperture 13 and apex 42 extends downwards towards a bottom 43 of aperture 13. By aligning base 40 with top 41 of aperture 13, air flow may be guided more efficiently towards and through aperture 13 and fan 14. In the embodiment shown in FIG. 4, inverted pyramid 36 is a truncated pyramid. In the embodiment shown in FIG. 2, inverted pyramid 36 has four sides 38. It will be understood by a person skilled in the art that the number of sides 38 of inverted pyramid 36 is dictated by the number of sides 20 of hood 12. In the embodiment shown in FIG. 7, the height of inverted pyramid 36 and length of base 40 of inverted pyramid 36 are equal.

Referring to FIG. 4, a pocket 44 is positioned on an exterior surface 46 of hood 12. Pocket 44 may house a multi-function meter 48 for measuring the current created by the rotation of fans 28. It will be understood by a person skilled in the art that any suitable voltage indicator may be used.

Any use herein of any terms describing an interaction between elements is not meant to limit the interaction to direct interaction between the subject elements, and may also include indirect interaction between the elements such as through secondary or intermediary structure unless specifically stated otherwise.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent that changes may be made to the illustrative embodiments, while falling within the scope of the invention. As such, the scope of the following claims should not be limited by the preferred embodiments set forth in the examples and drawings described above, but should be given the broadest interpretation consistent with the description as a whole.

What is claimed is:

1. An air conditioner energy recovery unit, comprising:
    a hood having a substantially pyramidal shape, the substantially pyramidal shape having at least three sides meeting at an apex, the hood having a hollow interior and an open base;
    each of the at least three sides having an aperture into which a fan is positioned, the fans in each of the at least three sides being connected together in series;
    a generator in communication with the fan such that when the fan rotates the generator creates electricity;
    a power storage in communication with the generator for storing electricity created by rotation of the fan;
    an inverted pyramid having a number of sides equal to the number of sides of the substantially pyramidal shape, a base and an apex, the inverted pyramid being positioned within the hollow interior of the hood such that the base of the inverted pyramid is adjacent the apex of the substantially pyramidal shape and the apex of the inverted pyramid is positioned below the base of the inverted pyramid, the base extending to each of the at least three sides of the substantially pyramidal shape such that the inverted pyramid seals off access to the apex of the hood from the hollow interior of the hood; and
    a voltage regulator positioned between the generator and the power storage.

2. The air conditioner energy recovery unit of claim 1 wherein the aperture and the fan are positioned centrally on at least one of the at least three sides.

3. The air conditioner energy recovery unit of claim 1 wherein the power storage has at least one battery.

4. The air conditioner energy recovery unit of claim 1 wherein the substantially pyramidal shape has four sides.

5. The air conditioner energy recovery unit of claim 1 wherein the inverted pyramid is a truncated pyramid.

6. The air conditioner energy recovery unit of claim 1 wherein a height of the inverted pyramid and a length of the base of the inverted pyramid are equal.

7. The air conditioner energy recovery unit of claim 1 further comprising a pocket positioned on an exterior surface of the hood.

8. The air conditioner energy recovery unit of claim 7 wherein the pocket houses a multi-function meter for measuring a current created by the rotation of the fans.

9. An air conditioner energy recovery unit, comprising:
    a hood having a substantially pyramidal shape, the substantially pyramidal shape having at least three sides meeting at an apex, the hood having a hollow interior and an open base;
    at least one of the at least three sides having an aperture into which a fan is positioned;
    a generator in communication with the fan such that when the fan rotates the generator creates electricity;
    a power storage in communication with the generator for storing electricity created by rotation of the fan, and;

an inverted pyramid having a number of sides equal to the number of sides of the substantially pyramidal shape, a base and an apex, the inverted pyramid being positioned within the hollow interior of the hood such that the base of the inverted pyramid is adjacent the apex of the substantially pyramidal shape and the apex of the inverted pyramid is positioned below the base of the inverted pyramid, the base extending to each of the at least three sides of the substantially pyramidal shape such that the inverted pyramid seals off access to the apex of the hood from the hollow interior of the hood;

a voltage regulator positioned between the generator and the power storage; and a pocket positioned on an exterior surface of the hood for holding the voltage regulator.

10. The air conditioner energy recovery unit of claim 9 wherein each of the at least three sides has an aperture into which a fan is positioned.

11. The air conditioner energy recovery unit of claim 10 wherein the fans positioned on each of the at least three sides are connected together in series.

12. The air conditioner energy recovery unit of claim 9 wherein the power storage has at least one battery.

13. The air conditioner energy recovery unit of claim 9 wherein the inverted pyramid is a truncated pyramid.

14. The air conditioner energy recovery unit of claim 9 wherein a height of the inverted pyramid and a length of the base of the inverted pyramid are equal.

15. An air conditioner energy recovery unit, comprising:

a hood having a substantially pyramidal shape, the substantially pyramidal shape having at least three sides meeting at an apex, the hood having a hollow interior and an open base;

each of the at least three sides having an aperture into which a fan is positioned, the fans in each of the at least three sides being connected together in series;

a generator in communication with the fan such that when the fan rotates the generator creates electricity;

a power storage in communication with the generator for storing electricity created by rotation of the fan, and;

an inverted pyramid having a number of sides equal to the number of sides of the substantially pyramidal shape, a base and an apex, the inverted pyramid being positioned within the hollow interior of the hood such that the base of the inverted pyramid is adjacent the apex of the substantially pyramidal shape and the apex of the inverted pyramid is positioned below the base of the inverted pyramid, the base extending to each of the at least three sides of the substantially pyramidal shape such that the inverted pyramid seals off access to the apex of the hood from the hollow interior of the hood;

a voltage regulator positioned between the generator and the power storage; and a pocket positioned on an exterior surface of the hood.

* * * * *